United States Patent [19]

Thulin et al.

[11] Patent Number: 4,910,029

[45] Date of Patent: Mar. 20, 1990

[54] SHELF-STABLE MULTITEXTURED COOKIES HAVING VISUALLY APPARENT PARTICULATE FLAVORING INGREDIENTS

[75] Inventors: Robert R. Thulin, Wyckoff; Robert E. Ross, Wayne; Nicholas R. Polifroni, Cliffside Park, all of N.J.

[73] Assignee: Nabisco Brands, Inc., East Hanover, N.J.

[21] Appl. No.: 147,639

[22] Filed: Jan. 25, 1988

Related U.S. Application Data

[63] Continuation of Ser. No. 657,409, Oct. 3, 1984, abandoned.

[51] Int. Cl.$^4$ ............................................. A21D 13/00
[52] U.S. Cl. ..................................... 426/94; 426/549; 426/560
[58] Field of Search ................. 426/549, 560, 601, 94, 426/658, 659, 660, 653

[56] References Cited

U.S. PATENT DOCUMENTS

| | | | |
|---|---|---|---|
| 4,344,969 | 8/1982 | Youngquist et al. | 426/18 |
| 4,360,534 | 11/1982 | Brabbs et al. | 426/560 |
| 4,444,799 | 4/1984 | Vanderveer et al. | 426/549 |
| 4,455,333 | 6/1984 | Hong et al. | 426/94 |
| 4,456,625 | 6/1984 | Durst | 426/106 |
| 4,503,080 | 3/1985 | Brabbs et al. | 426/94 |
| 4,511,318 | 4/1985 | Kolodesh et al. | 426/94 |
| 4,511,585 | 4/1985 | Durst | 426/106 |
| 4,528,900 | 7/1985 | Simelunas | 99/450.7 |
| 4,534,726 | 8/1985 | Sumelunas | 425/363 |
| 4,578,027 | 3/1986 | Koppa et al. | 425/298 |
| 4,579,744 | 4/1986 | Thulin et al. | 426/283 |
| 4,582,711 | 4/1986 | Durst | 426/128 |

FOREIGN PATENT DOCUMENTS

| | | |
|---|---|---|
| 31718 | 7/1981 | European Pat. Off. . |
| 119824 | 9/1984 | European Pat. Off. . |
| 119826 | 9/1984 | European Pat. Off. . |

*Primary Examiner*—Joseph Golian
*Attorney, Agent, or Firm*—Richard Kornutik

[57] ABSTRACT

Cookies having a shelf-stable plurality of textures and visually apparent flavor chips characteristic of freshly baked home-made cookies are prepared from dough pieces comprising a chewy cookie dough or filling enrobed by a crispier cookie dough. Each of the doughs of the dough pieces contain the flavor chips and upon baking at least substantially all of the pieces of the flavor chips of the crispier dough are partially visible at the surface of the cookie. The size, number, and composition of the flavor chip in each dough may be chosen to contribute to a chewy texture or a crispier texture.

15 Claims, No Drawings

SHELF-STABLE MULTITEXTURED COOKIES HAVING VISUALLY APPARENT PARTICULATE FLAVORING INGREDIENTS

This application is a continuation of application Ser. No. 657,409, filed Oct. 3, 1984, now abandoned.

FIELD OF THE INVENTION

This invention relates to cookies having a shelf-stable plurality of textures and visually apparent particulate flavoring ingredients. This invention also relates to cookie dough compositions for producing the cookies.

BACKGROUND OF THE INVENTION

Home-baked chocolate chip cookies are generally baked from a dough having the chocolate chips dispersed throughout the dough. The dough is subdivided into spoon size pieces and dropped onto a baking sheet. A typical recipe provided on the packaging of store-bought chocolate chips calls for about one cup of chocolate chips and about 2.5 cups of other chocolate chip cookie ingredients. This rather large proportion of chocolate chips, the generally large size of the chocolate chips (bottom diameter of about 0.4 in.) and the dough piece size assure the attainment of cookies having a plurality of chocolate chips which have a portion which is visually apparent.

Wire-cutting machines are generally used for the mass production of chocolate chip cookies from a single dough. The dough, like the dough prepared at home, contains the chocolate chips dispersed throughout prior to dough piece formation. On a wire-cutting machine, an extrudate rope is cut into disc-shaped dough pieces having visually apparent chocolate chips. These dough pieces are baked to provide cookies having visually apparent chocolate chips.

Conventional wire-cutting machines, however, cannot be used to mass produce cookies having a shelf-stable plurality of textures from a coextruded dough rope. Wire cutting desirably results in dough pieces having visually apparent chocolate chips. Undesirably, however, the dough bakeable to a chewy texture is also visually apparent to a degree which would result in a loss of the textural dichotomy which resembles that of a freshly baked cookie.

Mass-produced chocolate chip cookies obtained from dough pieces comprising a chewy dough or filling which is enrobed or encased in a crispy dough do not possess the desirable homebaked appearance when the chocolate chips are only included in the chewy dough.

Incorporation of chips into the outer dough which are not exposed in the baked product provides flavor enhancement without the desired chip-rich, home-baked appearance.

Additionally, preparing cookies so that chips present in the chewy dough are visually apparent to an appealing extent can adversely affect the appearance and textural stability of the product. These chips tend to undesireably cause the chewy dough to become visually apparent on the surface of the cookie. As the inner dough chip breaks through the casing dough, it carries the adherent filler dough with it.

During baking the cookie dough expands greatly or puffs, and the surface of the expanded dough cracks or opens up for release of water vapor and leavening gases. As the leavening gases and water vapor are exhausted, the dough contracts, and the cracks or openings narrow in width or reseal. The presence of the sealed-up cracks on the baked cookie surface provide a desireable home-baked appearance. However, the chips, being less porous than the dough, act as barriers to the escape of water vapor and leavening gas. The gases are channeled around the chips. The mass flow rate tends to be greater around the chips than through unobstructed dough portions. The higher gas mass flow rates results in the production of wider cracks, which exposes the interior of the cookie dough to higher oven temperatures. When chips of the moist inner dough penetrate through the outer cookie dough during baking, the high gas mass flows around the chip, and the exposure of the filling to higher temperatures tend to cause boil-over of filling to the outside surface. The higher moisture content and different composition of the filling generally results in a visually apparent discoloration on the surface of the cookie.

The large mass flow of leavening gas and water vapor around the chips also tends to leave voids or passageways in the baked dough surrounding the chips or at the interface between the baked dough and the chips. Additionally, the chips, being lipophilic, absorb shortening or fat from the dough surrounding the chips thereby enhancing the formation of voids or passageways. Migration of water by capillary action from the moister filling through voids or passageways which extend from the filling through the casing can lead to an undesireable drying out of the interior of the cookie, and loss of textural dichotomy.

The dough compositions of the present invention provide cookies having a shelf-stable plurality of textures characteristic of freshly baked cookies. In addition, the cookies have visually apparent particulate flavoring ingredients such as chocolate chips, which are visually apparent to the consumer in a manner characteristic to home-baked chocolate chip cookies.

SUMMARY OF THE INVENTION

The present invention provides a cookie having a shelf-stable plurality of textures with visually apparent particulate flavoring ingredients, such as chocolate chips. The cookies possess a soft or chewy interior and a crispier exterior characteristic of the texture of freshly baked cookies. The visually apparent particulate flavoring ingredient imparts a home-baked, chip-rich appearance to the cookie. At least substantially all of the pieces of the particulate flavoring ingredient of the crispier portion are partially visible at the surface of the baked cookie. This enhances consumer appeal for the mass produced product: (1) without excessive disruption of the crispier casing which could result in drying out of the chewier inner portion, and (2) without detracting from the desirable crispy mouthfeel provided by the cookie crumb. The multitextured cookies are produced from a cookie dough composition comprising: a) a chewy or soft cookie dough having discrete pieces of at least one particulate flavoring ingredient dispersed therein and, b) a crispier cookie dough which enrobes the chewy cookie dough and also contains discrete pieces of at least one particulate flavoring ingredient. The size number, and composition of the flavoring ingredient in each dough may be chosen to contribute to a chewy texture or a crispier texture. The cookies of the present invention are texturally stable and microbially stable for prolonged periods (preferably about 4 to 6 months) of storage at room temperature when properly packaged.

DETAILED DESCRIPTION OF THE INVENTION

The cookies of the present invention have a shelf-stable plurality of textures and visually apparent particulate flavoring ingredients. The cookies comprise a chewy portion which is enrobed by a crispier portion. The chewy portion and the crispier portion each contain particulate flavoring ingredients which interrupt the crumb forming the chewy portion and the crispier portion. At least substantially all of the pieces of particulate flavoring ingredient of the crispier portion are partially visible at the surface of the cookie to enhance visual appeal to the consumer without undesireable exposure or drying out of the chewier inner portion or filling.

Providing particulate flavoring ingredients in the crispier portion which are not visible to the consumer enhances flavor impact. However, it detracts from the desirable crispy mouthfeel provided by the cookie crumb without enhancing visual appeal. Accordingly, to achieve enhanced visual appeal without excessive disruption of the outer casing and without detracting from the desirable crispy mouthfeel of the cookie crumb, at least substantially all of the particulate flavoring ingredients which interrupt the crispy portion have a portion which is visually apparent at the surface of the cookie.

The pieces of particulate flavoring ingredient of the chewy or soft cookie dough should not be visibly apparent at the cookie surface to avoid exposure of the filling and to avoid the creation of passages between the moist inner portion of the cookie through the crispier portion of the cookie. The pieces of the flavoring ingredient of the chewy dough are desirably contained within the chewy portion and do not extend into the crispy portion of the cookie.

The cookie dough compositions of the present invention comprise a chewy cookie dough or a filling which is enrobed by a crispier cookie dough. The thickness of the crispy dough layer should be less than or equal to the largest dimension of the flavoring ingredient pieces, or chips, so as to assure attainment of at least substantially all the pieces being visible in the baked good. Upon baking, the cookie dough spreads to a considerable degree compared to the spread, if any, of the flavor chip. Accordingly, flavor chips contained within the crispy dough will pierce through the dough surface upon baking. The flavor chips of the chewy dough or filling should have a maximum dimension which is less than the thickness to which the chewy dough spreads to avoid undesirable piercing of the chips through the crispy portion of the cookie. The use of flavor chips which exhibit substantial spread or flattening during baking also assures avoidance of piercing of the crispy portion of the baked good. Increased chip sizes can be accordingly used in the chewy portion with chips that exhibit substantial spreading.

The use of flavor chips which exhibit substantial spread contributes to a chewy texture in the inner portion of the cookie. Also, the use of flavor chips which do not spread in the crispy dough contributes to a crispier texture in the outer portion of the cookie.

The particulate flavoring ingredient of the chewy dough and of the crispier dough may be based upon cocoa butter and/or hardened vegetable oils. The particulate flavoring ingredients, or flavor chips, may be chocolate flavored (chocolate chips), vanilla flavored, peanut flavored, coconut flavored, butterscotch flavored, caramel flavored, fruit flavored, or the like, and mixtures thereof. Typical hardened vegetable oils which can be used are hydrogenated cottonseed, coconut, soybean, palm, and peanut oils.

Soft textured, spreadable flavor chips for the chewy dough can be formulated in known manner using low melting point shortening or fat, using humectants such as glycerine, corn syrup solids, and humectant sugars such as fructose, lactose, glucose, and dextrose, and sugar (sucrose) having a fine particle size (10X for example). Lecithin and emulsifiers can also be used to control flavor chip softness. The proportion of shortening or fat to sugar may also be used to control softness or hardness of flavor chips in known manner. On the other hand, flavor chips which contribute to a crispy texture in the crispy portions of the cookie may comprise higher melting point fats, higher proportions of sugar (sucrose) and coarser sugar (for example 6X sugar).

Suitably, the particulate flavoring ingredient of the crispy dough comprises at least 10% by weight more sucrose than the particulate flavoring ingredient of the chewy dough. For contributing to the textural dichotomy of the cookie, the melting point of the particulate flavoring ingredient of the crispy portion is suitably at least about 15° F. higher than the melting point of the particulate flavoring ingredient of the chewy portion. The lower melting point flavor chips should not excessively smear into the dough upon mixing. To prevent smearing upon mixing, lower melting point chips may be coated with a higher melting point fat or shellac which melts during baking of the cookie.

Textural dichotomy may also be enhanced by the use of larger flavor chips in the chewy dough than in the crispy dough. For the same weight of flavor chips in each dough, the use of larger chips in the chewy dough results in a greater number of chips in the crispier dough. This provides for a greater number of encounters between teeth and chips thereby creating an impression of crispiness. Suitably, the average particle weight of the flavoring ingredient of the chewy portion is at least about 10% more than the average particle weight of the particulate flavoring ingredient of the crisp portion of the cookie. The difference in average particle weight should not be so large so as to detract from a desirable unitary, homogeneous home baked appearance.

Commercially available chips or specially formulated flavor chips may be used in the present invention. Typical commercially available flavor chips have particle sizes of about 1000 to about 10,000 counts or chips per pound.

The chewy cookie dough and the crispy cookie dough should each have flavor chips in an amount of at least about 5% by weight of the respective doughs. Preferably, each dough contains from about 10% by weight to about 18% by weight flavor chips, based upon the weight of the respective dough. Different flavored chips may be used in the crispy dough from those used in the chewy dough.

The total surface area of the portions of the flavor chips which are visually apparent on the top of the cookie is preferably from about 1% to about 8% of the surface area of the top of the cookie. The surface area of the visually apparent portions of the particulate flavoring ingredient and the surface area of the top of the cookie are calculated on a planar projection basis. By "planar projection basis" is meant the surface area as projected onto a plane above the cookie and parallel to a flat surface upon which the bottom of the cookie rests, the projection being perpendicular to the plane and to said flat surface.

Suitably, the projected surface area of the top of the cookie is in the range of from about 2.5 square inches to about 5 square inches, and the number of particulate flavoring ingredients, or chips, having a portion which is visually apparent on the top surface of the cookie is an integer of from 3 to 12.

The cookie dough for producing the chewy portion of the cookie may be any cookie dough formulation which is bakeable to a storage stable soft and plastic crumb matrix characteristic of chewy baked goods. For example, a chewy cookie dough bakeable to a shelf stable chewy texture can include flour, water, shortening or fat, a humectant, and a leavening agent as its basic ingredients.

It is well known that when humectants are added to a cookie dough, the product baked from such a dough will possess a plastic, moist and non-hardening crumb structure, which will be retained during storage in conventional packaging for greater than 2 weeks, and even up to periods of many months. A wide variety of food-compatible humectants may be employed for imparting shelf-stable chewiness to the chewy portion of the cookies of the present invention. Humectants which can be employed include sugar and/or non-sugar ingredients which bind moisture in a baked dough. The binding should be such that the equilibrium rate of moisture loss from the baked product to the environment due to the presence of the humectant is slowed to such degree that a baked product containing the humectant, and having an initial moisture content of at least about 6%, retains a soft and pliable texture for at least about 2 months, and preferably for at least about 4–6 months when the cookie is stored in a closed container.

Edible humectant gels such as a humectant sucrose and/or high fructose corn syrup gel can be used in the chewy cookie dough for achieving a soft and chewy texture for prolonged periods. Preparation of the gels and of doughs containing them for producing soft edible baked products having extended shelf-life is taught in U.S. Pat. No. 4,444,799. This patent is herein incorporated by reference in its entirety. A humectant sucrose gel can be prepared, for example, from a mixture of sucrose syrup, sodium alginate, and a calcium ion source. The gels may also be prepared as taught in pending U.S. Application Ser. No. 580,365, filed Feb. 16, 1984, which is a continuation-in-part of the latter patent.

Humectant sugars may be employed alone or in combination with non-humectant sugar (such as sucrose) to impart chewiness to the chewy portion of the cookie. Suitable humectant sugars include fructose, dextrose, corn syrups, invert syrups, high fructose corn syrups, honey, molasses, as well as mixtures of one or more of the foregoing humectants with sucrose. For example, a suitable humectant sugar composition for use in the chewy doughs of this invention may be comprised of about 0 to 85% sucrose, with the balance of the sugar being comprised of fructose, and/or dextrose employed in the form of the crystalline sugar. In the alternative, the balance of the sugar may be provided by the sugar solids content of a corn syrup, honey, or a high fructose corn syrup, or another humectant sugar.

Commercially available high fructose corn syrups are prepared by the enzymatic isomerization of dextrose containing corn syrups, and typically possess a sugar solids component of about 40% to about 100% by weight fructose, with the balance of the non-fructose sugar solids being primarily dextrose plus minor amounts of other monosaccharides. The sugar solids content of commercially available high fructose corn syrups typically ranges from about 70% to 73%, up to about 82% by weight. Examples of other humectant sugars include maltose, sorbose, mannose, lactose, galactose, etc. It is preferred that when sucrose is employed in the dough that the humectant sugar comprise at least about 15%, and most preferably at least about 20% by weight of the total sugar content of the dough.

In addition to the humectant sugars, a wide variety of humectants which are not sugars or possess a low degree of sweetness relative to sucrose may also be employed in the chewy doughs of this invention. For example, the use of glycerol, sugar alcohols such as mannitol, maltitol, xylitol, and sorbitol, and other polyols as humectants is well known in the art. Additional examples of humectant polyols (e.g. polyhydric alcohols) include humetant glycols, hydrogenated glucose syrups, sugar esters, dextrins, and other starch hydrolyzation products. When sucrose is employed in combination with one or more of the foregoing humectants, the humectant preferably comprises at least about 15%, and preferably at least about 20% by weight of the humectant and sucrose combination.

The humectant may be included in the dough as an added ingredient, or an enzyme may be included in the dough formulation which acts on a substrate also included in the dough during, before or after baking, to produce effective amounts of the humectant in situ in the dough. Examples of suitable enzymes for this purpose include invertase which effects the inversion of sucrose to invert sugar, as well as other glycosidases and polysaccharidases which after acting on carbohydrates present in the dough produce humectants as the by-product of their enzymatic activity.

Enzymes suitable for use herein include polysaccharidases which act upon farinaceous materials to produce lower molecular weight saccharides such as glucose, maltose, modified starches, dextrins, etc. Enzymes of this type include alpha- and beta- amylases. Alpha-amylases, such as those obtained from bacterial sources (*B.subtilis* or *B. mesintericus*) are known to be quite heat stable, and have been reported to be able to retain some activity at temperatures as high as 100° C. The number of SKB units of amylase enzyme per 100 grams of flour will typically be about 6 to 1000 SKB units. Pregelatinized starch may be added to the dough to provide a readily available substrate for the enzyme. SKB units may be assayed by the method of Sandstedt, Kneen and Blish, given in Cereal Chemistry, Vol 16, p. 712 (1939). Amylase enzymes are commercially available, and include Fresh-N, a product of G.B. Fermentation Industries, Inc., Charlotte, North Carolina, as well as Termamyl and Bacterial Amylase Novo (Ban) which are products of Novo Industries A/S, Novo Alle, DK-2880, Bagsvaerd, Denmark.

The flour and shortening employed in the chewy dough and in the crispier, enrobing dough of this invention are selected from conventional ingredient lines. The flour component may be any comminuted cereal grain or edible seed meal such as wheat flour, corn flour, corn starch, modified starch, rice flour, potato flour, barley flour, or the like. Wheat flour is preferred. The shortening may be any edible fat or oil or mixtures thereof suitable for baking applications, and may further include conventional food-grade emulsifiers.

The amount of flour, water, shortening and humectant employed in the chewy doughs of this invention may vary over a wide range depending upon the properties of the end product desired, and the processing steps employed. In general, however, on the basis of 100 pounds of the flour component of the dough, the humectant plus any sucrose or other sweetener employed (e.g. artificial sweeteners) in the formulation may be present in amounts ranging from about 25 to about 150 pounds depending on the degree of sweetness and humectant properties desired in the baked product. The shortening may be present in amounts ranging from about 20 to about 80 pounds per 100 pounds of flour.

The initial moisture content of the chewy dough is adjusted to provide the desired consistency to the dough to enable proper working and shaping of the dough. The total moisture content of the dough will include any water included as a separately added ingredient, as well as the moisture provided by flour which usually contains 12% to 14% by weight moisture, and the moisture content of other dough additives which may be included in the formulation such as high fructose corn syrup or invert syrups. Taking into account all sources of moisture in the dough, including separately added water, the total initial moisture content of the dough may range from about 20% to about 60% by weight of the dough formulation.

In addition to the foregoing, the chewy dough and crispier enrobing dough may include other additives conventionally employed in cookie products. Exemplary thereof are milk products or milk by-products, egg products or egg by-products, cocoa, vanilla, cereal (oatmeal), as well as inclusions such as nuts, raisins, coconut, etc.

The dough employed for the crispy texture can be a conventional sucrose-containing dough comprised of flour, water, shortening and a sugar component comprised of above about 85% by weight sucrose. Of course, an amount of one or more of the humectant materials described above may also be included in the dough bakeable to a crispy texture. The amount of humectant should be such that it does not bind water or inhibit sucrose crystallization to a degree that it undesirably detracts from the desired crispier texture in the baked product.

A suitable cookie dough bakeable to a crispy texture may comprise based on 100 pounds of flour, from about 25 to 150 pounds of granulated sucrose, from about 20 to about 80 pounds of shortening, and from about 0 to 5 pounds of a conventional leavening system.

The chewy cookie dough and the crispier cookie dough can each be prepared in conventional manner using a creaming stage and a dough forming stage. The flavor chips are added to each dough with minimal mixing so as to avoid smearing thereof into the dough.

The dough bakeable to a chewy texture and the dough bakeable to a crispier texture may be combined by coextrusion through concentric dies to obtain a coextrudate rope with the chewy dough inside and the crispier dough outside. The coextrudate rope is cut into pieces using a reciprocating cutter which severs the rope and stretches the outer dough to close the end portions of the rope so as to obtain an enrobed dough piece which is bakeable to the cookie of the present invention. Apparatus for forming the enrobed dough piece is described in detail, and incorporated herein by reference, in pending U.S. Application Ser. No. 540,982, now U.S. Pat. No. 4,528,900, "High Production Method And Apparatus For Forming Filled Edible Products", filed in the name of William Simelunas on Oct. 11, 1983.

Incorporation of the flavor chips into each dough prior to coextrusion is preferred. However, the flavor chips for the crispier dough may be applied to the surface of the coextrudate rope prior to cutting of the rope with the reciprocating cutter described above. The cutter embeds the chips essentially completely or partly into the outer dough. The depth of embedment can be controlled by the amount of clearance between the top of the severed dough piece and the bottom curved surface of the cutter in the cutter's lowest or severing position. The clearance can be controlled by altering the extrudate rope diameter or the depth of the cup-shaped portion of the cutter.

The dough pieces bakeable to the multitextured cookies of the present invention suitably have a weight ratio of the chewy dough or filling to the crispier dough within the range of from about 0.80 to about 1.2, approximately equal amounts of each dough being preferred.

The time and temperature of baking are adjusted in accordance with conventional techniques to provide a moisture content in the baked product of 6% or above. While baking time and temperatures will vary for different dough formulations, oven type, etc., in general, commercial cookie baking times may range from about 5 minutes to 15 minutes, and baking temperatures for cookie products may range from about 250° F. to about 500° F.

As employed in the context of the present invention, the term "chewy" is intended to define textures which possess a discernible degree of plasticity. Chewiness also connotes impressions of softness and moistness. Crispness ad chewiness can be described in terms of taste panel tests which take as standards the texture of fresh saltine crackers having a moisture content of about 2% (rating of 0) and a freshly baked cookie having a distinctly chewy texture throughout (rating of 10): i.e., chewy cookies prepared in accordance with the following recipe:

| | |
|---|---|
| ⅔ c. | sugar |
| ¼ c. | butter or regular margarine |
| 1 tsp. | ground ginger |
| ½ tsp. | ground cinnamon |
| ½ tsp. | baking soda |
| ½ tsp. | salt |
| ½ tsp. | vanilla |
| 1 | egg |
| ½ c. | honey |
| 1½ c. | sifted flour |

The cookies are prepared by combining ⅔ cup of sugar, butter, ginger, cinnamon, baking soda, salt and vanilla in a large mixing bowl and creaming the ingredients until they are light and fluffy. Next the eggs are added and beat in until the mixture is very fluffy. The honey is then blended in, followed by the blending in of the flour a little at a time. The dough is dropped by teaspoonfuls 2 ½ inches apart onto a lightly greased baking sheet, baked at 350° F. for 10 to 15 minutes until lightly browned and removed at once from the baking sheet to racks to cool thoroughly.

Employing the rating scale described above, the chewy portion of the product of this invention preferably has a rating of at least 3 and most preferably at least 5. The crispy portion preferably has a rating of less than 5 and most preferably less than 2. The regions should show a difference in ratings of at least 2 units, and most preferably at least 5 units.

Shelf-stable multitextured cookies having visually apparent particulate flavoring ingredients in accordance with the present invention may be formulated using filling materials other than chewy cookie doughs, which provide a moister, softer mouthfeel than the outer cookie dough. Exemplary of such materials are fruit pastes, such as fig paste, apple, cherry, or blueberry fillings, and cream fillings, such as an Oreo® cream filling, or pudding fillings. In accordance with the present invention at least substantially all of the pieces of particulate flavoring ingredient of the outer cookie dough are visually apparent in the baked product to enhance consumer appeal and to avoid exposure and drying out of the moister filling material.

The present invention is further illustrated in the following examples where all parts, ratios, and percentage are by weight, and all temperatures are in °F., unless otherwise stated:

EXAMPLE 1

A dual-textured chocolate chip cookie is prepared by coextruding an inner dough bakeable to a chewy texture with an outer cookie dough bakeable to a crispy texture through a concentric die into a coextrudate rope. The rope is severed with a reciprocating cutter having hemispherically shaped dough forming sections into enrobed dough pieces. The weight of the inner ball of dough is about equal to the weight of the outer crispy dough. The ingredients and their relative amounts used to prepare the dough portion bakeable to a crispy texture are:

| Ingredient | Amount (Pounds) |
|---|---|
| flour | 100 |
| granulated sugar | 70 |
| hydrogenated vegetable shortening | 50 |
| baking powder | 3 |
| water | 20 |
| chocolate drops (4800 count) | 35 |

The dough bakeable to a crispy texture is prepared by first mixing granulated sugar and shortening until a smooth consistency is obtained. Next, the water and leavening agent are added to the foregoing and mixed. The flour is blended with the outer ingredients to form a dough. As a final step, the chocolate drops are blended into the dough at slow speed.

The ingredients and their relative amounts used to prepare the dough portion bakeable to a soft or chewy texture are:

| Ingredients | Amount (pounds–ounces) |
|---|---|
| Flour | 100–0 |
| Chocolate drops (4200 count) | 58–0 |
| Sucrose | 25–0 |
| Shortening | 45–0 |
| Humectant | 93–0 |
| Milk Powder | 4–0 |
| Sodium Bicarbonate | 1–8 |
| Sodium Acid Pyrophosphate | 0–5 |
| Modified Corn Starch | 8–8 |
| Eggs | 5–8 |
| Flavorants and other minor ingredients | 1–8 |
| Water | 13–0 |

The humectant is a grindable humectant sucrose gel prepared from a mixture comprising 100 parts by weight sucrose syrup (about 67% by weight solids), 1 part by weight sodium alginate gum (Kelco gel LV, sold by Kelco division, Merck & Co.) and 0.6 parts by weight hydrous calcium sulfate. The gel is ground in a low-shear meat-grinder apparatus for incorporation into the dough.

The chewy cookie dough is prepared by first mixing in an upright mixer at a slow speed the sucrose, the ground sucrose gel, and the shortening, to achieve a homogeneous mixture. The modified starch, milk powder, eggs and flavorants are mixed in and the water is added while mixing at a slow mixing speed. This is followed by the addition with mixing of the flour, sodium bicarbonate and sodium acid pyrophosphate for about two to three minutes. As a final step, the chocolate chips are blended into the dough at slow speed.

The enrobed cookie preform is then prepared, and the composite dough is baked to an end point moisture content of above about 7.0%, and cooled at room temperature. The cookie is stored in a closed container at room temperature until the moisture in the cookie has equilibrated between the crispy and chewy regions of the cookie. The outer dough portion has a crispy texture and the inner dough portion possesses a soft and plastic crumb matrix having a distinctly leavened appearance. The tops of the cookies have planar projection surface areas of from about 3 sq. in. to about 3.5. sq. in. of which about 1.5% to about 4.5% is due to the presence of chocolate chips. The tops of the cookies have from about 3 to 10 chips which are visually apparent and attractive to the naked eye.

EXAMPLE 2

Multitextured cookies are made as in Example 1 except 4200 count butterscotch chips are substituted for the chocolate chips of the crispy dough.

EXAMPLE 3

Multitextured cookies are made as in Example 1 except 100 lbs. of high fructose corn syrup are substituted for the sucrose gel.

What is claimed is:

1. A cookie having a shelf stable plurality of textures and visually apparent particulate flavoring ingredients comprising:
   (a) a first portion baked from a chewy or soft cookie dough comprising flour, shortening or fat, a humectant, and at least one particulate flavoring ingredient in an amount of at least about 5% by weight of said dough, the particulate flavoring ingredient from said soft cookie dough being dispersed through and interrupting said first portion, and not visually apparent at the cookie surface, and (b) a crispier second portion enrobing said first portion, said second portion being baked from a crisper cookie dough comprising flour, shortening or fat, and at least one particulate flavoring ingredient in an amount of at least about 5% by weight of the crispier dough, at least substantially all of the pieces of the particulate flavoring ingredient from said crispier cookie dough being partially visible at the surface of the cookie and interrupting said second portion, the particulate flavoring ingredient of said first portion and said second portion comprising a sugar and, shortening or fat, and the average particle weight of the particulate flavoring ingredient of said first portion being at least about 10% by weight more than the average particle weight of the particulate flavoring ingredient of said second portion.

2. A cookie as claimed in claim 1 wherein the total surface area of the portions of the particulate flavoring ingredient which are visually apparent on the top of the cookie is from about 1% to about 8% of the surface area of the top of the cookie, the surface area of the visually apparent portions of the particulate flavoring ingredient and the surface area of the top of the cookie being calculated on a planar projection basis.

3. A cookie as claimed in claim 2 wherein the projected surface area of the top of the cookie is in the range of from about 2.5 square inches to about 5 square inches, and the number of particulate flavoring ingredients having a portion which is visually apparent on the top surface of the cookie is an integer of from 3 to 12.

4. A cookie as claimed in claim 1 wherein the particulate flavoring ingredient of said first portion contributes to a chewy texture and the particulate flavoring ingredient of said second portion contributes to a crispier texture.

5. A cookie as claimed in claim 1 wherein said humectant is a gel comprising sucrose.

6. A cookie as claimed in claim 1 wherein the particulate flavoring ingredient of said first and second portions comprises chocolate chips.

7. A cookie as claimed in claim 4 wherein the particulate flavoring ingredient of said first portion comprises a humectant sugar.

8. A cookie as claimed in claim 5 wherein said second portion comprises sucrose.

9. A cookie as claimed in claim 4 wherein the particulate flavoring ingredient of said second portion comprises at least about 10% by weight more sucrose than the particulate flavoring ingredient of said first portion.

10. A cookie as claimed in claim 4 wherein the melting point of the particulate flavoring ingredient of said second portion is at least about 15° F. higher than the melting point of the particulate flavoring ingredient of said first portion.

11. A cookie as claimed in claim 8 wherein the weight ratio of the chewy dough to the crispier dough is from about 0.90 to about 1.2.

12. A cookie as claimed in claim 1 wherein the particulate flavoring ingredient of the crispy cookie dough possesses a different flavor than the flavor of the particulate flavoring ingredient of the chewy dough.

13. A cookie having visually apparent particulate flavoring ingredients comprising a filling with at least about 5% by weight of discrete pieces of at least one particulate flavoring ingredient, and a casing enrobing said filling, aid casing being baking from a cookie dough comprising flour, shortening, or fat and at least about 5% by weight of the casing dough of discrete pieces of at least one particulate flavoring ingredient comprising a sugar, and shortening or fat, wherein at least substantially all of the pieces of the particulate flavoring ingredient from said casing dough have a portion which is visually apparent, and wherein said filling is unexposed and said particulate flavoring ingredient from said chilling is not visually apparent at the cookie surface, the average particle weight of the particulate flavoring ingredient of said first portion being at least about 10% by weight more than the average particle weight of the particulate flavoring ingredient of said second portion.

14. A cookie dough composition as claimed in claim 13 wherein the total surface area of the portions of the particulate flavoring ingredient which are visually apparent on the top of the cookie is from about 1% to about 8% of the surface area of the top of the cookie, the surface area of the visually apparent portions of the particulate flavoring ingredient and the surface area of the top of the cookie being calculated on a planar projection basis.

15. A cookie dough composition as claimed in claim 14 wherein the projected surface area of the top of the cookie is in the range of from about 2.5 square inches to about 5 square inches, and the number of particulate flavoring ingredients having a portion which is visually apparent on the top surface of the cookie is an integer of from 3 to 12.

* * * * *